(12) United States Patent
Hocke et al.

(10) Patent No.: US 9,422,162 B2
(45) Date of Patent: Aug. 23, 2016

(54) CARBON NANOTUBE AGGLOMERATE

(75) Inventors: Heiko Hocke, Leverkusen (DE); Ralph Weber, Leichlingen (DE); Elmar Bramer-Weger, Alfter (DE)

(73) Assignee: Covestro Deutschland AG, Leverkusen (DE)

( * ) Notice: Subject to any disclaimer, the term of this patent is extended or adjusted under 35 U.S.C. 154(b) by 332 days.

(21) Appl. No.: 13/391,361

(22) PCT Filed: Aug. 7, 2010

(86) PCT No.: PCT/EP2010/004845
§ 371 (c)(1),
(2), (4) Date: Feb. 20, 2012

(87) PCT Pub. No.: WO2011/020568
PCT Pub. Date: Feb. 24, 2011

(65) Prior Publication Data
US 2012/0149824 A1    Jun. 14, 2012

(30) Foreign Application Priority Data
Aug. 21, 2009  (DE) .......................... 10 2009 038 464

(51) Int. Cl.
| | |
|---|---|
| *D01F 9/12* | (2006.01) |
| *C01B 31/02* | (2006.01) |
| *B01J 21/18* | (2006.01) |
| *B01J 23/00* | (2006.01) |
| *B01J 23/85* | (2006.01) |
| *B01J 23/889* | (2006.01) |
| *B01J 37/03* | (2006.01) |
| *B01J 37/08* | (2006.01) |
| *B82Y 30/00* | (2011.01) |
| *B82Y 40/00* | (2011.01) |

(Continued)

(52) U.S. Cl.
CPC ........... *C01B 31/0206* (2013.01); *B01J 20/205* (2013.01); *B01J 21/185* (2013.01); *B01J 23/002* (2013.01); *B01J 23/85* (2013.01); *B01J 23/889* (2013.01); *B01J 23/8892* (2013.01); *B01J 37/031* (2013.01); *B01J 37/08* (2013.01); *B82Y 30/00* (2013.01); *B82Y 40/00* (2013.01); *B01J 2523/00* (2013.01); *Y10T 428/298* (2015.01)

(58) Field of Classification Search
CPC ........ B01J 21/185; B01J 20/205; B01J 23/85; B01J 23/889; B01J 23/8892; B01J 37/031; B01J 37/08; B01J 23/002; B01J 2523/00; B82Y 30/00; B82Y 40/00; C01B 31/0206
USPC ........ 423/447.1–447.3, 445 B; 977/742–754, 977/842–848
See application file for complete search history.

(56) References Cited

U.S. PATENT DOCUMENTS

| 4,663,230 A | 5/1987 | Tennent |
| 4,855,091 A | 8/1989 | Geus et al. |

(Continued)

FOREIGN PATENT DOCUMENTS

| DE | 102004054959 A1 | 5/2006 |
| DE | 102007044031 A1 | 3/2009 |

(Continued)

*Primary Examiner* — Daniel C McCracken
(74) *Attorney, Agent, or Firm* — Drinker Biddle & Reath LLP

(57) ABSTRACT

The invention relates to a method for producing carbon nanotubes in the agglomerated form and thus obtained novel carbon nanotube agglomerates.

8 Claims, 2 Drawing Sheets

(51) Int. Cl.
B01J 20/20 (2006.01)
*D01F 9/127* (2006.01)

(56) References Cited

U.S. PATENT DOCUMENTS

| | | | |
|---|---|---|---|
| 5,726,116 | A | 3/1998 | Moy et al. |
| 5,747,161 | A | 5/1998 | Iijima |
| 6,294,144 | B1 | 9/2001 | Moy et al. |
| 6,911,260 | B2 | 6/2005 | Ren et al. |
| 7,198,772 | B2 | 4/2007 | Moy et al. |
| 2008/0170982 | A1* | 7/2008 | Zhang et al. ............... 423/447.3 |
| 2009/0087372 | A1* | 4/2009 | Buchholz et al. ........... 423/447.2 |
| 2009/0124705 | A1 | 5/2009 | Meyer et al. |
| 2009/0140215 | A1 | 6/2009 | Buchholz et al. |

FOREIGN PATENT DOCUMENTS

| | | |
|---|---|---|
| DE | 102007046160 A1 | 4/2009 |
| EP | 56004 A2 | 7/1982 |
| EP | 01988558 | 10/1986 |
| EP | 205556 A1 | 12/1986 |
| EP | 1209123 A2 | 5/2002 |
| GB | 1469930 A | 4/1977 |
| WO | WO-86/03455 A1 | 6/1986 |
| WO | WO-2006/050903 A2 | 5/2006 |
| WO | WO-2009036877 A2 | 3/2009 |
| WO | WO-2009043445 A1 | 4/2009 |

* cited by examiner

CARBON NANOTUBE AGGLOMERATE

PRIORITY

Priority is claimed as a national stage application, under 35 U.S.C. §371, to PCT/EP2010/004845, filed Aug. 7, 2010, which claims priority to German Application No. 10 2009 038 464.2, filed Aug. 21, 2009. The disclosures of the aforementioned priority applications are incorporated herein by reference in their entirety.

BACKGROUND

The invention relates to a process for the production of carbon nanotubes in agglomerated form and novel carbon nanotube agglomerates obtainable therefrom.

According to the prior art, carbon nanotubes are understood as being chiefly cylindrical carbon tubes having a diameter of from 3 to 100 nm and a length which is a multiple of the diameter. These tubes comprise one or more layers of ordered carbon atoms and have a core of different morphology. These carbon nanotubes are also called, for example, "carbon fibrils" or "hollow carbon fibres".

Carbon nanotubes have been known for a long time in the technical literature. Although Iijima (publication: S. Iijima, Nature 354, 56-58, 1991) is generally named as the discoverer of carbon nanotubes, these materials, in particular fibrous graphite materials with several layers of graphite, have already been known since the 1970s or early 1980s. Tates and Baker (GB 1469930A1, 1977 and EP 56004 A2) described for the first time the deposition of very fine fibrous carbon from the catalytic decomposition of hydrocarbons. Nevertheless, the carbon filaments produced on the basis of short-chain hydrocarbons are not characterized in more detail with respect to their diameter.

Conventional structures of these carbon nanotubes are those of the cylinder type. In the case of cylindrical structures, a distinction is made between the single-wall mono-carbon nanotubes (single wall carbon nano tubes) and the multi-wall cylindrical carbon nanotubes (multi wall carbon nano tubes). The usual processes for their production are e.g. arc processes (arc discharge), laser ablation, chemical deposition from the vapour phase (CVD process) and catalytic chemical deposition from the vapour phase (CCVD process).

Iijima, Nature 354, 1991, 56-8 discloses the formation of carbon tubes in the arc discharge process which comprise two or more layers of graphene and are rolled up to a seamless closed cylinder and nested in one another. Depending on the rolling up vector, chiral and achiral arrangements of the carbon atoms in relation to the longitudinal axis of the carbon fibres are possible.

Carbon nanotubes which have a so-called fishbone morphology are moreover described (J. W. Geus, EP application 198,558) and again others which have a bamboo-like structure (Z. Ren, U.S. Pat. No. 6,911,260 B2).

Structures of carbon tubes in which an individual cohesive layer of graphene (so-called scroll type) or interrupted layer of graphene (so-called onion type) is the basis of the structure of the nanotubes were described for the first time by Bacon et al., J. Appl. Phys. 34, 1960, 283-90. The structure is called scroll type. Corresponding structures were also found later by Zhou et al., Science, 263, 1994, 1744-47 and by Lavin et al., Carbon 40, 2002, 1123-30.

A further type of scroll structures was described recently in the patent application WO2009036877 A2. These CNT structures comprise several layers of graphene which are present combined into a stack and rolled up (multiscroll type). The individual layers of graphene or graphite in these carbon nanotubes, seen in cross-section, run continuously from the centre of the CNT to the outer edge without interruption.

In the context of the invention, all the carbon nanotube structures described above are summarized in the following simply as carbon nanotubes, fibrils or CNT or MWCNT.

The methods now known for the production of carbon nanotubes include arc discharge, laser ablation and catalytic processes. In many of these processes carbon black, amorphous carbon and fibres of high diameter are formed as by-products. In the case of the catalytic processes, a distinction may be made between the deposition on e.g. supported catalyst particles and the deposition on metal centres formed in situ with diameters in the nanometer range (so-called flow process). In the production via the catalytic deposition of carbon from hydrocarbons which are gaseous under the reaction conditions (CCVD; catalytic carbon vapour deposition in the following), acetylene, methane, ethane, ethylene, butane, butene, butadiene, benzene, toluene, xylene and further carbon-containing educts are mentioned as possible carbon donors. CNTs obtainable from catalytic processes are therefore preferably employed.

The catalysts as a rule contain metals, metal oxides or decomposable or reducible metal components. For example, Fe, Mo, Ni, V, Mn, Sn, Co, Cu and further sub-group elements are mentioned as metals for the catalyst in the prior art. The individual metals indeed usually have a tendency to assist in the formation of carbon nanotubes, although according to the prior art high yields and low contents of amorphous carbons are advantageously achieved with those metal catalysts which are based on a combination of the abovementioned metals. CNTs obtainable using mixed catalysts are consequently preferably to be employed.

Particularly advantageous catalyst systems for the production of CNTs are based on combinations of metals or metal compounds which contain two or more elements from the series consisting of Fe, Co, Mn, Mo and Ni.

From experience, the formation of carbon nanotubes and the properties of the tubes formed depend in a complex manner on the metal component used as the catalyst or a combination of several metal components, the catalyst support material optionally used and the interaction between the catalyst and support, the educt gas and its partial pressure, an admixing of hydrogen or further gases, the reaction temperature and the dwell time or the reactor used.

WO 2006/050903 A2 discloses a process which is particularly preferably to be employed for the production of carbon nanotubes.

In the various processes mentioned so far employing various catalyst systems, carbon nanotubes of different structures, which can be removed from the process predominantly as carbon nanotube powder, are produced.

Carbon nanotubes which are further preferably suitable for the invention are obtained by processes which are described in principle in the following literature references:

The production of carbon nanotubes with diameters of less than 100 nm is described for the first time in EP 205 556 B1. For the production, light (i.e. short- and medium-chain aliphatic or mono- or dinuclear aromatic) hydrocarbons and a catalyst based on iron, on which carbon carrier compounds are decomposed at a temperature above 800-900° C., are employed here. A detailed description of the agglomerate morphology of the carbon nanotubes has not been given.

WO86/03455A1 describes the production of carbon filaments which have a cylindrical structure with a constant diameter of from 3.5 to 70 nm, an aspect ratio (ratio of length to diameter) of greater than 100 and a core region. These fibrils comprise many continuous layers of ordered carbon atoms which are arranged concentrically around the cylindrical axis of the fibrils. These cylinder-like carbon nanotubes were produced by a CVD process from carbon-containing compounds by means of a metal-containing particle at a temperature of between 850° C. and 1,200° C. The catalyst for this reaction was obtained by impregnation of various aluminium oxides with iron salts in aqueous solution. The aluminium oxides were partly calcined under oxidative conditions at temperatures of up to 1,100° C. before the loading with iron salts and up to 500° C. after the loading. A reductive calcining of the aluminium oxide supports loaded with iron up to 1,100° C. was also investigated. The fibrils produced were examined under a microscope, although no information is given on fibril agglomerates or the morphology thereof. Moy and colleagues (U.S. Pat. No. 5,726,116, U.S. Pat. No. 7,198,772 B2; Hyperion Catalysis International Inc.) report for the first time on various fibril agglomerate morphologies which form according to the catalyst support chosen. In this context, Moy distinguishes between 3 morphologies, the bird's nest structure (BN) the combed yarn structure (CY) and the open net structure (ON). In the bird's nest structure (BN), the fibrils are arranged randomly tangled in a form such that a ball of fibrils intertwined with one another similar to the structure of a bird's nest is formed. This structure can be obtained e.g. by employing aluminium oxide as the support material for the iron/molybdenum catalyst.

The combed yarn structure (CY) comprises bundles of carbon nanotubes which mostly have the same orientation relative to one another. The open net structure (ON) is formed by fibril agglomerates in which the fibrils are loosely woven with one another. These two structures are formed when gamma-aluminium oxide, e.g. ALCOA H705, or magnesium oxide (Martin Marietta) is used as the support material with precipitated or impregnated catalysts. The descriptions of the morphologies contain no more precise information with respect to the size of the agglomerates, definitions of the alignments of the CNT within the agglomerates or further physical or geometric parameters for characterization of the structures. The agglomerates formed from CY and ON structures are said to be more easily dispersible than those of the BN structure.

Another method for the production of CNT catalysts is co-precipitation of metal compounds, e.g. of oxides, from a solution. Spherical particles of mixed metal oxides are formed from this simultaneous precipitation. In contrast to the supported catalyst systems described above, in which the active metal is to be found only on the surface of an (inert) support substance, in the case of the co-precipitated spherical mixed oxides the catalytic active metal is distributed everywhere within the catalyst particle homogeneously with the other metal oxides. The loading with active metal and therefore the efficiency is increased. The catalytically inactive metal oxides function here as binders and spacers. In the ideal case, this catalyst is broken open completely during the reaction and all the active metal centres become accessible for the reaction. The original catalyst particle is completely destroyed in this process. Moy et al. (U.S. Pat. No. 6,294,144; U.S. Pat. No. 7,198,772) investigated systematically co-precipitated catalysts based on iron, molybdenum and aluminium oxide for the synthesis of carbon nanotubes and in all cases obtained CNT agglomerates with a bird's nest structure (BN).

The patent application WO 2009 043445 A2 describes a co-precipitated catalyst based on a mixed oxide of cobalt, manganese, aluminium and magnesium oxide which is suitable for the production of carbon nanotubes and is distinguished by a very high efficiency. The carbon nanotube agglomerates obtained in this way are distinguished by a high degree of tangling, similarly to the CNT with a bird's nest structure, in which the individual CNT are woven with one another without alignment. The dispersing of these agglomerates, e.g. in polymers or low-viscosity systems, such as solvents, is made difficult as a result. The forces necessary for good dispersing also lead, in addition to breaking up of the CNT agglomerates, to undesirable damage to the individual CNT (e.g. shortening) and the polymer (reduction in the molecular weight).

It is desirable to have a process for the production of CNT agglomerates in which the catalyst delivers high conversions and CNT yields and the product is to be simultaneously dispersed in polymers (thermoplastics) easily and with a low introduction of energy and force, in order to avoid damage both to the individual CNT and to the polymer during breaking up of the agglomerate.

DESCRIPTION

Figure 1:
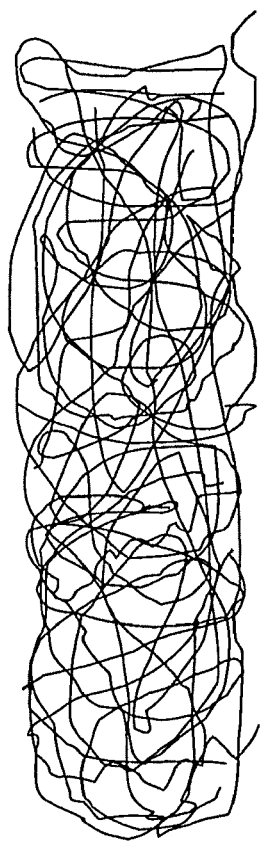
FIG. 1 shows an agglomerate of carbon nanotubes with buldged-out yarns of carbon nanotubes.

The invention provides an agglomerate of carbon nanotubes which have a diameter of from 3 to 100 nm and a length to diameter ratio of at least 5, characterized in that the agglomerate contains bundles of carbon nanotubes in the form of bulged-out yarns of carbon nanotubes intertwined with one another, wherein the carbon nanotubes in the bulged-out yarn bundle have an average distance from one another in the range of from 20 to 100 nm, preferably 30 to 80 nm, particularly preferably 40 to 60 nm.

In a preferred embodiment of the novel agglomerate, the carbon nanotubes are present in the bulged-out yarn of CNT, which form the agglomerate, in particular in a form loosely intertwined in one another. The bulged-out yarns of CNT in the agglomerate essentially have a diameter of from 0.1 µm to 20 µm, preferably from 0.14 µm to 10 µm and particularly preferably from 0.18 µm to 3 µm. The diameter of the bulging yarns in the agglomerate varies in particular in the abovementioned range when viewed over the length of the yarn. The CNT within the yarns are essentially not aligned straight with respect to one another, but in contrast to the CY structures described (shown in diagram form in FIG. 2) have an essentially unordered position relative to one another (shown in diagram form in FIG. 1).

A form of the novel agglomerate in which at least 95 wt. % of the agglomerate particles have an outer diameter in the range of from 20 µm to 6,000 µm, preferably 60 µm to 4,000 µm, particularly preferably 100 µm to 1,500 µm is preferred.

Preferably, the agglomerate has a bulk density according to EN ISO 60 of from 20 to 250 kg/m$^3$, preferably 40 to 200 kg/m$^3$, particularly preferably 50 to 150 kg/m$^3$.

In a preferred variant of the novel agglomerate, the agglomerate contains, apart from the carbon nanotube bundles in the form of bulged-out yarns, other structured bundle forms of carbon nanotubes, in particular those of the series consisting of carbon nanotube bundles in a combed yarn structure, in a bird's nest structure, in an open net structure or in the form of fibril bundles aligned parallel to one another, up to a content of less than 30%, preferably at most 20%, particularly preferably at most 10%.

A further preferred embodiment of the agglomerate is characterized in that the carbon nanotubes have a content of impurities, in particular of metals or metal compounds, particularly preferably of metal oxides, of at most 7 wt. %, preferably at most 5 wt. %.

Particularly preferably, the novel agglomerates are built up such that the carbon nanotubes are present in the form of multi-wall carbon nanotubes, in particular those which have graphite tubes (cylinder type) nested in one another, or are based on rolled-up, multi-layer graphene layers (scroll type). The latter MWCNT types are described in detail, for example, in the specifications: U.S. Pat. No. 5,747,161, U.S. Pat. No. 4,663,230 and WO2009 036 877 A2. Particularly preferably, the novel agglomerates are based on MWCNT of the scroll type.

A novel production process has also been developed for the production of the abovementioned novel agglomerates.

The invention therefore also provides a process for the production of agglomerates from carbon nanotubes, in which in a first step a catalyst precursor is formed from metal salts of metals of sub-group VIII of the periodic table, in particular of iron, cobalt or nickel, preferably of cobalt, with metal salts of metals of sub-group VI or VII of the periodic table, in particular with metals from the series consisting of manganese, molybdenum, chromium and tungsten, preferably of manganese, by precipitation of the solution on a support, in particular to give oxides and/or hydroxides or, where appropriate, hydrates thereof, or co-precipitation of the metal salt solutions, in particular to give oxides and/or hydroxides or, where appropriate, hydrates thereof, with one or more metal compounds of the series consisting of aluminium, magnesium, silicon, zirconium, titanium, from aqueous solution, the catalyst precursor is freed from solvents,
the catalyst precursor in then subjected to thermal after-treatment,
the catalyst precursor being subjected, during the thermal after-treatment, to a high temperature calcining in the presence of non-reducing gases, optionally under reduced pressure, in particular in the presence of air, at a temperature of at least 800° C.,
the catalyst obtained by this procedure is then subjected, if appropriate, to a reductive after-treatment,
and on the catalyst obtained, at a temperature of at least 500° C. in the presence of precursor compounds containing hydrogen and carbon, in particular hydrocarbons, the catalytic decomposition of the carbon precursor compounds, in particular the hydrocarbons, particularly preferably a compound from the series consisting of: acetylene, methane, ethane, ethylene, butane, butene, butadiene, benzene, alkylbenzene, in particular toluene or xylene, particularly preferably ethylene, is carried out and the CNT agglomerates obtained by this procedure are isolated.

Preferably, the catalyst precursor is formed by means of co-precipitation of metal salt solutions of the abovementioned metals, in particular of nitrates, chlorides or carboxylates, in particular acetates, of at least two metals from the series consisting of cobalt, manganese, molybdenum, aluminium and magnesium.

Preferably, the co-precipitation of the metal salts is carried out from an acidic solution of the metal salts with the aid of alkali metal or alkaline earth metal hydroxide solutions or alkaline solutions based on ammonia.

In a preferred embodiment of the process, the high temperature calcining is carried out at a temperature of from 800 to 1,100° C., preferably 850 to 1,100° C., particularly preferably 900 to 1,050° C.

A particularly preferred variant of the novel process is characterized in that the reaction of the hydrocarbon is carried out in a fluidized bed with continuous or discontinuous addition of the catalyst, optionally using a (e.g. inert) carrier gas, e.g. nitrogen or hydrogen, and with subsequent continuous discharge of the carbon nanotube agglomerate from the fluidized bed.

In a preferred embodiment, the catalyst precursor to be employed is prepared by co-precipitation of the catalytically active metal compounds of Co and Mn together with at least one further component, which in further steps of the catalyst treatment forms either an inactive binder material or an intermediate, catalytically active mixed compound, from water-soluble salts in an aqueous medium by means of alkaline solutions. Examples of such further components which may be mentioned are Al, Mg, Si, Zr, Ti etc. and the usual elements which form mixed metal oxides and are known to the person skilled in the art. The precipitation is effected in particular by addition of basic solutions, in particular of alkali metal hydroxide solution, alkaline earth metal hydroxide solution or ammonia-based alkaline solutions (e.g. ammonium hydroxide or simple amines) to the metal salt solution (or vice versa). The content of the further components can be up to 80 wt. %, based on the total catalyst weight. Preferably, the catalysts have a content of further components of 5-75 wt. %.

The catalyst precursor obtained in the form of a solid can be separated from the mother liquor by methods which are known in principle to the person skilled in the art, such as filtering, centrifuging, evaporating and concentrating. Centrifugation and filtration are preferred. The solid obtained can be washed further or further employed directly as obtained. For an improved ease of handling of the solid obtained, this can be dried. As is known for heterogeneous catalysts, a further conditioning may be of advantage. A shaping and/or classifying can precede or follow the conditioning.

The catalyst particularly preferably to be employed in the novel process contains 45-55 mol % of Mn and 55-45 mol % of Co, based on the content of catalytically active components, as elements.

The high temperature calcining of the catalyst can be carried out, for example, continuously or discontinuously, where continuously or discontinuously can relate both to the feeding of the dried catalyst precursor and to removal of the catalyst.

The high temperature calcining of the catalyst can be carried out in various types of reactors. There may be mentioned here by way of example, without thereby making a limitation, fluidized bed reactors, rotary tube reactors or reactors with an agitated bed.

The high temperature calcining of the catalyst can also be carried out in a procedure coupled with the actual CNT production, stepwise in the same reactor. In this context, in a first step the catalyst precursor is first treated in an oxidative or inert gas stream at the appropriate temperature, and then in a second step, after appropriate replacement of the gas, the catalyst treated in this way is used in the same reactor under conditions which are suitable for the formation of CNT agglomerates.

The invention also provides carbon nanotube agglomerates obtained from the novel production process.

The novel carbon nanotube agglomerates are used beneficially in a number of different uses. The invention consequently provides the use of the novel carbon nanotube agglomerates as an addition for polymers, rubber, ceramics, metals, metal alloys, glasses, textile fibres and composite materials.

The invention furthermore provides mixtures or composites which comprise carbon nanotubes and which are produced by addition of novel carbon nanotube agglomerates described above to polymers, rubber, ceramics, metals, metal alloys, glasses or textile fibres.

The invention moreover provides the use of the novel carbon nanotube agglomerates as an electrically conductive addition in electrodes, in membranes for separation of substances, solar cells, actuators, sensors, inks or pastes and in energy storage devices, in particular in batteries, accumulators, fuel cells or capacitors.

The invention also provides the use of the novel carbon nanotube agglomerates as a substrate for pharmaceutical active compounds or for plant protection active substances.

The invention moreover provides the use of the novel carbon nanotube agglomerates as adsorbers, in particular for volatile compounds, e.g. for gases, or biological compounds, in particular for enzymes.

The invention also provides the use of the novel carbon nanotube agglomerates as a support or container for catalysts.

The invention is explained in more detail by way of example in the following with the aid of the embodiment examples.

EXAMPLES

Example 1

Preparation of Catalyst 1; Calcining at 400° C., Comparison Example

A solution of 306 g of $Mg(NO_3)_2*6H_2O$ in water (0.35 liter) was mixed with a solution of 360 g of $Al(NO_3)_3*9H_2O$ in 0.35 l of water. 170 g of $Mn(NO_3)_2*4H_2O$ and 194 g of $Co(NO_3)_2*6H_2O$, in each case dissolved in 0.5 l of water, were then added and the entire mixture was brought to a pH of approx. 2 by means of addition of nitric acid, while stirring for 30 min. A stream of this solution was mixed with 20.6 wt. % strength sodium hydroxide solution in a mixer and the suspension formed was added to a reservoir of 5 l of water. The pH of the reservoir was kept at approx. 10 by controlling the addition of sodium hydroxide solution.

The solid which had precipitated out was separated off from the suspension and washed several times.

The washed solid was then dried in a paddle drier in the course of 16 h, the temperature of the drier being increased from room temperature to 160° C. within the first eight hours. The solid was than calcined for 12 hours at an oven temperature of 500° C. (final temperature measured in the sample 400° C.) in the presence of air and then cooled for 24 hours. The catalyst material was then left to stand at room temperature for a further 7 days for after-oxidation. A total of 121.3 g of catalyst material were isolated.

Example 2

Preparation of Catalyst 2; Calcining at 600° C., 3 h, Comparison Example

Analogously to Example 1, catalyst material was prepared but was additionally calcined in a muffle furnace in the presence of air at 600° C. for 3 h. Thereafter, the solid was cooled and weighed. 110 g were isolated.

Example 3

Preparation of Catalyst 3; Calcining at 600° C., 6 h, Comparison Example

Analogously to Example 1, catalyst material was prepared but was additionally calcined in a muffle furnace in the presence of air at 600° C. for 6 h. Thereafter, the solid was cooled and weighed. 109 g were isolated.

Example 4

Preparation of Catalyst 4; Calcining at 1,000° C., 3 h; According to the Invention Analogously to Example 1, catalyst material was prepared but was additionally calcined in a muffle furnace in the presence of air at 1,000° C. for 3 h. Thereafter, the solid was cooled and weighed. 109 g were isolated.

Example 5

Production of CNT 1 in a Fluidized Bed, Comparison Example

The catalyst prepared in Example 1 was tested in a fluidized bed apparatus on the laboratory scale. Catalyst 1 is initially introduced into a steel reactor which has an internal diameter of 100 mm and is heated from the outside by a heat transfer medium. The temperature of the fluidized bed was regulated via PID regulation of the heat transfer medium. The temperature of the fluidized bed was determined by a thermocouple. The educt gases and inert dilution gases were passed into the reactor via electronically controlled mass flow regulators.

The reactor was first rendered inert with nitrogen and heated up to a temperature of 700° C. An amount of 18.0 g of catalyst 1 prepared according to Example 1 was then metered in.

Thereafter, the educt gas as a mixture of ethene and nitrogen was directly switched on. The volume ratio of the educt gas mixture was ethene:$N_2$=90:10. The total volume flow was adjusted to 40 LN·$min^{-1}$ (normal liters per min). The charging of the catalyst with the educt gases was carried out for a period of 31 minutes. The reaction starts up in less than 2 min (lower measurement limit for technical reasons) and shows a high activity of the catalyst (on-line measurement of the hydrogen content with a gas chromatograph).

Thereafter, the continuing reaction was stopped by interrupting the educt feed and the contents of the reactor were removed.

The amount of carbon which had been deposited was determined by weighing and the structure and morphology of the carbon deposited was determined with the aid of SEM and TEM analyses. The amount of carbon deposited based on the catalyst employed, called yield in the following, was defined on the basis of the weight of catalyst after calcining (mcat,0) and the increase in weight after the reaction (mtotal−mcat,0): yield=(mtotal−mcat,0)/mcat,0.

The experiment was carried out 5 times in succession. The products obtained were combined to one sample and analysed. The catalyst yield was 44.7 g of carbon nanotube powder per g of catalyst employed. The bulk density of the product was 146.0 g/l. The carbon fibres had an average diameter of 10.5 nm. The length to diameter ratio of the CNT was at least 100. The agglomerates predominantly (>95 wt. %) had a diameter of from 0.1 to 1 mm.

REM photographs of the agglomerate obtained showed a bird's nest (BN) structure as the agglomerate morphology.

Example 6

Production of CNT 2, Comparison Example

The catalyst prepared in Example 2 was tested in a fluidized bed apparatus on the laboratory scale. The experiment for this was carried out analogously to Example 5 with the catalyst from Example 2. The reactor was first rendered inert with nitrogen and heated up to a temperature of 700° C. An amount of 18.0 g of catalyst 2 prepared according to Example 2 was then metered in.

Thereafter, the educt gas as a mixture of ethene and nitrogen was directly switched on. The volume ratio of the educt gas mixture was ethene:$N_2$=90:10. The total volume flow was adjusted to 40 LN-min$^{-1}$. The charging of the catalyst with the educt gases was carried out for a period of 31 minutes. The reaction starts up in less than 2 min (lower measurement limit for technical reasons) and shows a high activity of the catalyst (on-line measurement of the hydrogen content with a gas chromatograph). Thereafter, the continuing reaction was stopped by interrupting the educt feed and the contents of the reactor were removed.

The experiment was carried out 5 times in succession. The products obtained were combined to one sample and analysed. The catalyst yield was 53.0 g of carbon nanotube powder per g of catalyst employed. The bulk density of the product was 152.4 g/l. The carbon fibres had an average diameter of 12.0 nm. The length to diameter ratio of the CNT was at least 100. The agglomerates predominantly (>95 wt. %) had a diameter in the range of from 0.1 to 1 mm.

REM photographs of the agglomerate obtained showed a bird's nest (BN) structure as the agglomerate morphology.

Example 7

Production of CNT 3, Comparison Example)

The catalyst prepared in Example 3 was tested in a fluidized bed apparatus on the laboratory scale. The experiment for this was carried out analogously to Example 5 with the catalyst from Example 3. The reactor was first rendered inert with nitrogen and heated up to a temperature of 700° C. An amount of 18.0 g of catalyst 3 prepared according to Example 3 was then metered in.

Thereafter, the educt gas as a mixture of ethene and nitrogen was directly switched on. The volume ratio of the educt gas mixture was ethene:$N_2$=90:10. The total volume flow was adjusted to 40 LN-min$^{-1}$. The charging of the catalyst with the educt gases was carried out for a period of 31 minutes. The reaction starts up in less than 2 min (lower measurement limit for technical reasons) and shows a high activity of the catalyst (on-line measurement of the hydrogen content with a gas chromatograph). Thereafter, the continuing reaction was stopped by interrupting the educt feed and the contents of the reactor were removed.

The experiment was carried out 5 times in succession. The products obtained were combined to one sample and analysed. The catalyst yield was 53.6 g of carbon nanotube powder per g of catalyst employed. The bulk density of the product was 150.8 g/l. The carbon fibres had an average diameter of 12.7 nm. The length to diameter ratio of the CNT was at least 100. The agglomerates predominantly (>95 wt. %) had a diameter in the range of from 0.1 to 1 mm.

REM photographs of the agglomerate obtained showed a bird's nest (BN) structure as the agglomerate morphology.

Example 8

Production of CNT 4; According to the Invention

The catalyst prepared in Example 4 was tested in a fluidized bed apparatus on the laboratory scale. The experiment for this was carried out analogously to Example 5 with the catalyst from Example 4. The reactor was first rendered inert with nitrogen and heated up to a temperature of 700° C. An amount of 18.0 g of catalyst 4 prepared according to Example 4 was then metered in.

Thereafter, the educt gas as a mixture of ethene and nitrogen was directly switched on. The volume ratio of the educt gas mixture was ethene:$N_2$=90:10. The total volume flow was adjusted to 40 LN-min$^{-1}$. The charging of the catalyst with the educt gases was carried out for a period of 31 minutes. The reaction starts up only after about 7 min. This is significantly later than in the experiments from Example 5 to 7. The activity of the catalyst (on-line measurement of the hydrogen content with a gas chromatograph) is likewise considerably lower than in Example 5 (about 70%). The continuing reaction was stopped by interrupting the educt feed and the contents of the reactor were removed.

The experiment was carried out 5 times in succession. The products obtained were combined to one sample and analysed. The catalyst yield was 24.3 g of carbon nanotube powder per g of catalyst employed. The bulk density of the product was 141.3 g/l. The carbon fibres had an average diameter of 9.7 nm. The length to diameter ratio of the CNT was at least 100. The agglomerates predominantly (>95 wt. %) had a diameter in the range of from 0.1 to 1 mm.

Figure 2:
FIG. 2 shows a combed yarn (CY) structure of carbon nanotubes.
Figure 3:
FIG. 3 show a structure of carbon nanotubes.
Figure 4:
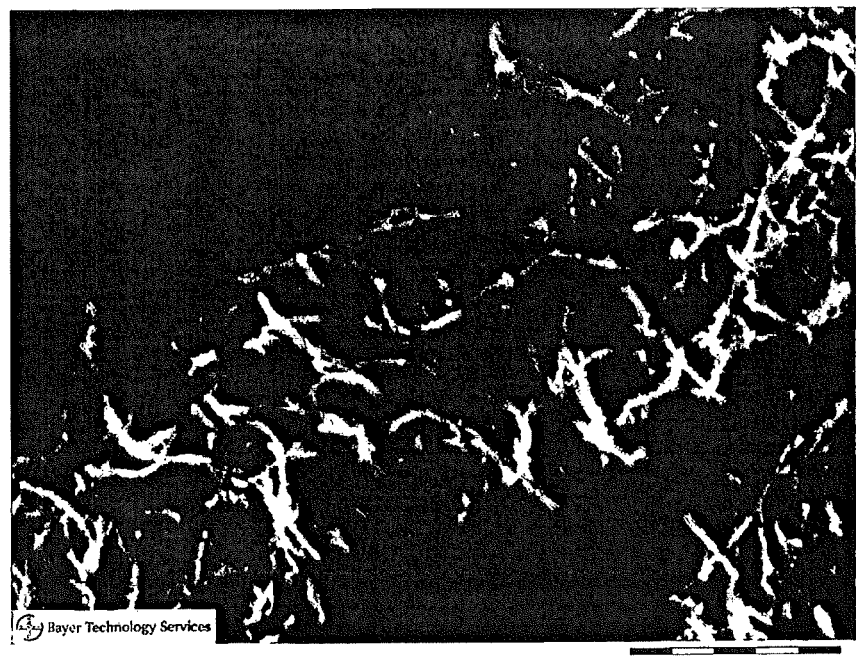
FIG. 4 shows a structure of carbon nanotubes.

REM photographs of the agglomerate obtained showed that the agglomerate comprised many bulge-shaped CNT yarns, within which the individual CNT are woven loosely with one another and essentially are not aligned straight with respect to one another or parallel (see FIGS. 1 and 2).

Example 9

Incorporation of CNT 1 into PC, Comparison Example

Because of the high surface area of the carbon nanotubes, individualization is expedient only in combination with a stabilization (immobilization in a matrix, addition of substances acting as a stabilizer) of the state of individualization, since otherwise rapid reagglomeration of the carbon nanotubes occurs due to the high van der Waals forces or thermal movements of the individualized carbon nanotubes.

The carbon nanotube powder CNT 1 produced in Example 5 was introduced into the main intake of a co-rotating twin-screw extruder (ZSK 26Mc, L/D 36) together with polycarbonate (Makrolon 2805). The temperature of the extruder was 280° C. The throughput was adjusted to 26 kg/h of composite and the speed of rotation to 400 rpm. The weight ratio of the carbon nanotube powder to polycarbonate was 3:97. The strand emerging from the extruder was cooled in a water bath and then granulated. A TEM photograph of a section prepared from the composite showed that the carbon nanotubes were partly present in the polycarbonate still in agglomerated form. The composite was then injection moulded on an Arburg 370 S 800-150 injection moulding machine to give circular sheets with a diameter of 80 mm and a thickness of 2 mm. The sprue was on the side. The injection moulding conditions were mould temperature 90° C., melt temperature 340° C. and advance 10 mm/s. The surface resistance was then measured with a ring electrode (Monroe model 272, 100 V). The sample showed a surface resistance of greater than $10^{12}$ ohm. The polymer degradation was also determined by means of GPC. The PC showed an Mw of 27,027 g/mol (previously 28,000 g/mol).

Example 10

Incorporation of CNT 4 into PC, According to the Invention

The carbon nanotube powder CNT 4 produced in Example 8 was introduced into the main intake of a co-rotating twin-screw extruder (ZSK 26Mc, L/D 36, screw configuration identical to Example 9) together with polycarbonate (Makrolon 2805). The temperature of the extruder was 280° C. The throughput was adjusted to 26 kg/h of composite and the speed of rotation to 400 rpm. The weight ratio of the carbon nanotube powder to polycarbonate was 3:97. The strand emerging from the extruder was cooled in a water bath and then granulated. A TEM photograph of a section prepared from the composite showed that the carbon nanotubes were present in the polycarbonate chiefly in individualized form. The composite was then injection moulded on an Arburg 370 S 800-150 injection moulding machine to give circular sheets with a diameter of 80 mm and a thickness of 2 mm. The sprue was on the side. The injection moulding conditions were mould temperature 90° C., melt temperature 340° C. and advance 10 mm/s. The surface resistance was then measured with a ring electrode (Monroe model 272, 100 V). The sample showed a surface resistance of $2 \cdot 10^8$ ohm. The polymer degradation was also determined by means of GPC. The PC showed an Mw of 27,543 g/mol (previously 28,000 g/mol). Compared with the material shown in Example 9 (comparison example), significantly less degradation of the molecular weight of the polymer results.

The invention claimed is:

1. Particles comprising an agglomerate of carbon nanotubes which have a diameter of from 3 to 100 nm and a length to diameter ratio of at least 5, wherein the agglomerate contains bundles of carbon nanotubes in the form of bulged-out yarns of carbon nanotubes intertwined with one another, wherein the carbon nanotubes in the bulged-out yarn bundle have an average distance from one another in the range of from 20 to 100 nm, wherein at least 95 wt. % of the agglomerate particles have an outer diameter in the range of from 100 µm to 1500 µm.

2. The agglomerate particles according to claim 1, wherein the agglomerate has a bulk density according to EN ISO 60 of from 20 to 250 kg/m3.

3. The agglomerate particles according to claim 1, wherein the carbon nanotubes are present in the bulged-out yarn bundle intertwined in one another and essentially are not aligned straight with respect to one another.

4. The agglomerate particles according to claim 1, wherein the bulged-out yarns of carbon nanotubes essentially have a diameter of from 0.1 µm to 20 µm.

5. The agglomerate particles according to claim 1, wherein the agglomerate contains, apart from the carbon nanotube bundles in the form of bulged-out yarns, other structured bundle forms of carbon nanotubes, in a bird's nest structure, in an open net structure or in the form of fibril bundles aligned parallel to one another, up to a content of less than 30%.

6. The agglomerate particles according to claim 1, wherein the carbon nanotubes have a content of impurities of at most 7 wt. %.

7. The agglomerate particles according to claim 1, wherein the carbon nanotubes are present in the form of multi-wall carbon nanotubes or are based on rolled-up, multi-layer graphene layers.

8. A mixture or composite comprising particles according to claim 1 and a polymer, a rubber, a ceramic, a metal, a metal alloy, a glass or a textile fiber.

\* \* \* \* \*